United States Patent [19]

Miller

[11] 4,021,012

[45] May 3, 1977

[54] JACK STAND

[75] Inventor: Jack V. Miller, Sierra Madre, Calif.

[73] Assignee: Acroform, Los Angeles, Calif.

[22] Filed: June 18, 1976

[21] Appl. No.: 697,399

[52] U.S. Cl. .............................. 248/352; 248/161; 248/188.6; 248/354 R

[51] Int. Cl.² .............................. F16M 13/00

[58] Field of Search .............. 248/157, 411, 188.6, 248/354 R, 354 L, 354 C, 352, 168, 423, 161, 431, 432, 166, 174, 525, 526, 357; 254/11, DIG. 1; 211/190, 196, 205

[56] References Cited

UNITED STATES PATENTS

| | | | |
|---|---|---|---|
| 1,105,910 | 8/1914 | Kellerher | 248/526 |
| 1,267,741 | 5/1918 | Buck | 248/352 |
| 2,183,427 | 12/1939 | Hou | 248/352 X |
| 2,297,316 | 9/1942 | Padgett | 248/188.6 X |
| 3,162,410 | 12/1964 | Owens | 248/188.6 X |
| 3,802,658 | 4/1974 | Binding | 248/423 X |

*Primary Examiner*—J. Franklin Foss
*Attorney, Agent, or Firm*—John E. Wagner

[57] ABSTRACT

A telescoping jack stand made of stamped metal parts with a pair of angularly extending legs which are pivotally mounted with respect to each other. The legs define an aperture between the legs with inwardly extending integral teeth. A central column member includes matching teeth and corresponding in shape and dimension with the aperture between the two legs. The central column includes recesses corresponding to the integral teeth of the legs. The legs are pivoted with respect to each other so that upon engagement of the teeth with the recesses in the column, additional load tends to pivot the teeth into greater engagement with the column and provide improved stability.

8 Claims, 9 Drawing Figures

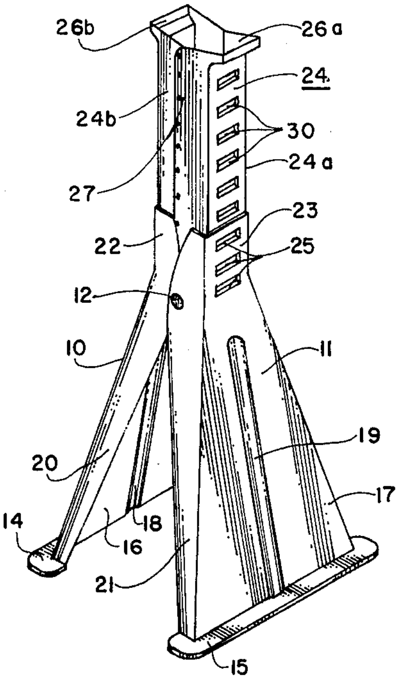
FIG. 1
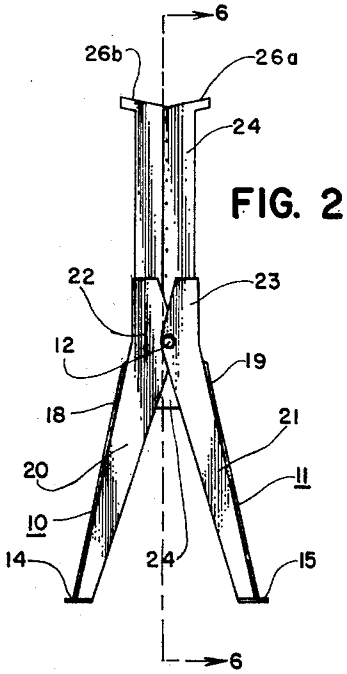
FIG. 2
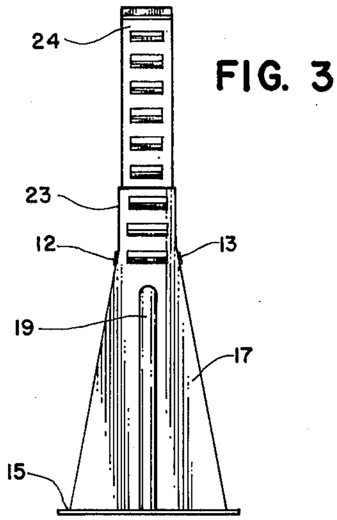
FIG. 3
FIG. 4
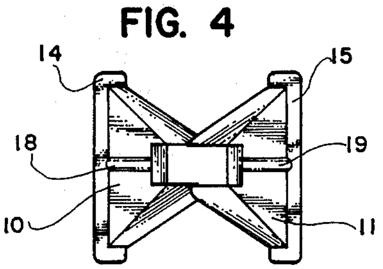
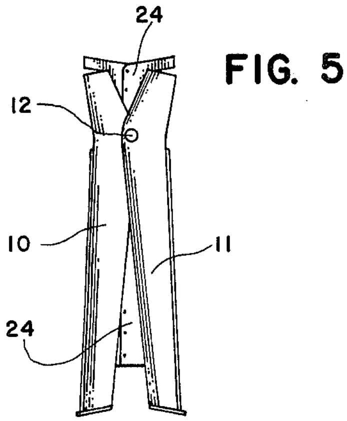
FIG. 5

JACK STAND

BACKGROUND OF THE INVENTION

Jack stands for use in automobile repair are designed to support a vehicle axle when the vehicle has been raised. The jack stands per se are used to support the vehicle as opposed to ramps and lifting jacks, which are used to raise the vehicle. Jack stands support the vehicle during the repair process and are therefore designed for stable immobile operation when in use. They do require a degree of adjustability while being placed, depending upon the height of the vehicle axle above the ground or other work surface.

Since jack stands are designed to be of a immobile nature when in use, they do not require screw actuators, and in fact are designed to act as a single element without movement when in place.

The simplest example of a jack stand is a wood block which is moved into place after the automobile axle is raised. Another example of a jack stand is a pipe having one end split into three sections and spread to constitute a base. Both of these types of jack stands exhibit principally low cost. The block, of course, is not adjustable in height, other than its normal dimensions, or by stacking shims, a dangerous practice. Some of the pipe jack stands are adjustable by having coaxial pipes with a pin passing through mating holes in the outer and the inner coaxial pipes. Pipe jack stands, although inexpensive, having three point support usually exhibit a degree of instability and are subject to failure due to the serious discontinuity in the pipe at the point of spreading where stress concentrations exist.

BRIEF STATEMENT OF THE INVENTION

With the foregoing in mind, I have invented an improved telescoping, folding jack stand. It exhibits a high degree of strength yet lightness in weight and lowness in cost. It further exhibits a property of increasing strength and stability with the application of the load of the vehicle to the stand.

Briefly, the invention involves a pair of leg members which are pivoted together at an intermediate point and include a flared leg portion and a semi-rectangular portion. Two identical leg portions are pivoted together such that they define a substantially rectangular opening therethrough and a pair of flaring legs. Positioned within the rectangular opening is a rectangular column which acts as the direct support for a vehicle on the upper end. The upper end is flared slightly to receive the vehicle axle.

Integral teeth are formed inwardly in their rectangular section of each of the leg members, for example, three on each leg member, equally spaced in a longitudinal direction. The column includes integral recesses adapted to receive the teeth when the leg members are pivoted with the leg portion flaring outward and the teeth members extending into the rectangular opening. The recesses on the column are more numerous than the teeth whereby the height of the column may be adjusted incrementally with the teeth engaging different recesses.

The relationship of the leg members and the column is such that the application of weight to the column causes a spreading of the feet and increases the engagement of the inner walls of the rectangular portions of the legs with the outer walls of the column and more particularly increasing the engagement between the teeth and recesses, thereby stabilizing the entire structure. The jack stand is made solely from pressed steel parts riveted together.

BRIEF DESCRIPTION OF THE DRAWINGS

This invention may be more clearly understood from the following detailed description and by reference to the drawing in which:

FIG. 1 is a perspective view of the jack stand in accordance with this invention, ready for use;

FIG. 2 is a side elevational view of the jack stand of FIG. 1;

FIG. 3 is a front elevational view of the jack stand of FIG. 1;

FIG. 4 is a top view of this invention;

FIG. 5 is a side view of this invention folded flat for storage;

DETAILED DESCRIPTION OF THE INVENTION

Figure 6:
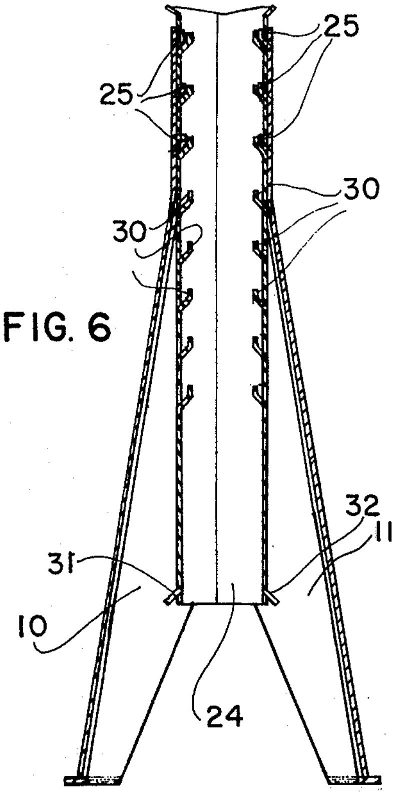
FIG. 6 is a vertical sectional view along line 6—6 of FIG. 2.

Now referring to FIGS. 1–3, a jack stand of this invention may be seen as including a pair of legs 10 and 11, which are pivotally connected by a pair of rivets or other fasteners 12 and 13. Each leg includes a bottom flange 14 and 15 respectively, a wall portion 16 and 17 respectively having an integral reinforcing rib 18 and 19 as well as a pair of angular edge walls 20 and 21. The legs terminate in an upper semi-rectangular portion 22 and 23 which define a generally rectangular opening into which a similarly shaped column 24 extends. The legs 10 and 11 each include integral inwardly extending teeth 25, for example, three in number. The column 24 is made up of a pair of similar rectangular members **24*a* and 24*b*, each of which have flared tops 26*a* and 26*b*. The column parts 24*a* and 24*b* are preferably spot welded together at points 27 or otherwise secured together to form a unitary column. The parts 24*a* and 24*b* also include integral recesses 30 formed by inwardly extending stampings and a construction recess portion of the side wall, thereby forming lips for engaging with the teeth 25** or the legs.

The rivets 12 and 13 space the two legs 10 and 11 sufficient distance apart that there is slight clearance between the internal rectangular opening between the legs 10 and 11 and the external rectangular surface of the column 24.

Note referring particularly to FIGS. 1 and 2 together, that the location of the rivets 12 and 13 provide the pivot pin about which the portions 22 and 23 are rotated inwardly against the column 24 if the legs 10 and 11 are expanded outward. The application of a load to the column 24 transfers that load to the rectangular sections 22 and 23 by the mating tongue and groove, e.g. teeth 25 and slots 30 and produces a compressing locking effect on the column 24. This is accomplished when a load is applied to the head portion 26 of the column. This load is transferred to the broad base illustrated in FIG. 4.

With the load removed and the column 24 raised slightly to disengage the teeth 25 from the slot 30, the legs 10 and 11 may be pivoted inwardly together, as shown in FIG. 5 and the column 24 dropped down between the legs into a position of minimum volume for the entire assembly. In this arrangement, the jack stand may be stored in a far smaller volume than jack stands herebefore.

Figure 7:
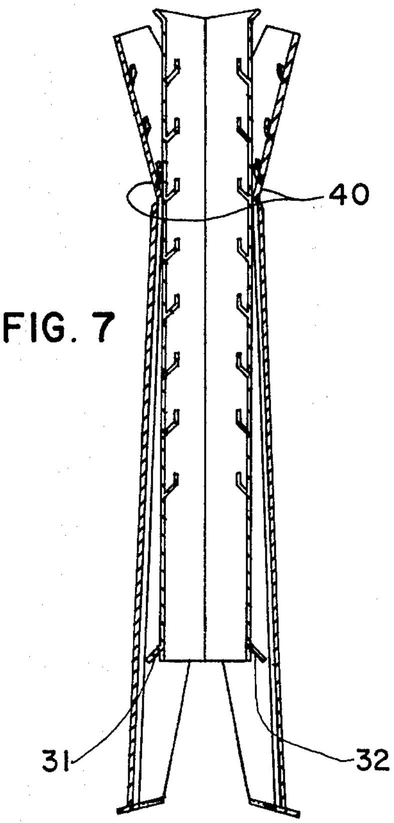
FIG. 7 is a vertical sectional view through the jack stand when in a folded position similar as shown in FIG. 5.
Figure 9:
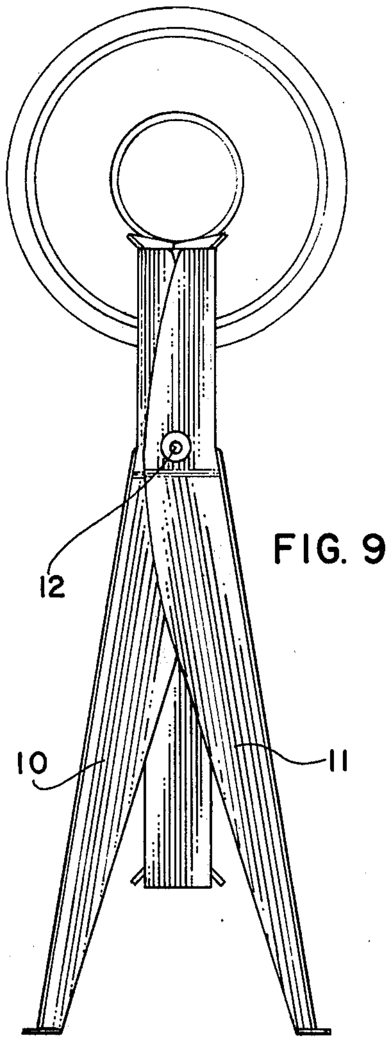
FIG. 9 is a vertical elevational view of a jack stand of this invention with an axle in place.

When in this collapsed for storage position, the column 24 may be moved upwards and downwards to the minimum volume position but may not be removed, since it is captured by a pair of tangs or fingers 31 and 32, appearing in FIGS. 7 and 9, extending outward at the bottom end of the column 24. These fingers 31 and 32 add sufficient breadth that they will not pass through the restricted portion of the leg assembly adjacent to the rivets 12 and 13. Thus, the column 24 is effectively captured.

The internal arrangement of the column is best seen in the section view of FIG. 6. Typically, the interlocking arrangement on both sides of the column 24 by the teeth 25 is apparent. The interlocking arrangement between the teeth 25 and the slots 30 on both sides of column 24 is clearly apparent. Also, the relatively close conformance between the upper portion of the legs 10 and 11 and the column 24 giving a relatively solid structure in operation may be seen. The relative positions of the legs 10 and 11 and the column 24 when the jack stand is stored, is visible in FIG. 7. In that Figure, note that there is a narrow constriction or throat 40 adjacent to the rivets 12 and 13, one of which appears in FIG. 5. This throat 40, cooperating with the flange portions **26*a* and 26*b* and the tangs 31 and 32 insure that the column 24 is captured while folded and also insures close conformance of the legs to the column 24** while in an operational position.

Figure 8:
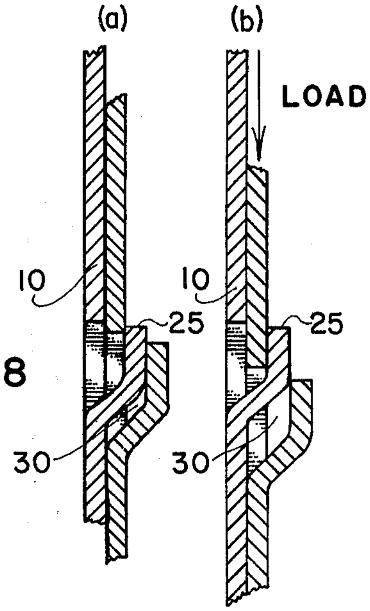
FIG. 8 is a large fragmentary view of the interlocking teeth arrangement in accordance with this invention.

FIG. 8(*a*) shows the interlocking arrangement of the teeth 25 and the slots 30 when the legs are expanded and teeth initially interlocked. Note that only a slight overlap occurs. In FIG. 8(*b*), the same view shows the relationship of the leg 10 with the column 24 with a load in place. Note that the tooth 25 thoroughly engages the slot 30, making failure of the jack stand without ultimate failure of the entire material, a practical impossibility.

An arrangement as in FIG. 8(*b*) with the load in place is illustrated in FIG. 9.

The above described embodiments of this invention are merely descriptive of its principles and are not to be considered limiting. The scope of this invention instead shall be determined from the scope of the following claims, including their equivalents.

What is claimed is:

1. A jack stand comprising a pair of legs;

each leg including a portion extending laterally to provide a base for support of the jack stand when said legs are spread partially apart;

means pivotally mounting said legs to move to a position generally adjacent to each other, outward to an extreme support position;

the upper ends of said legs defining a substantially closed tubular portion;

said leg portions including inwardly extending teeth in spaced opposite juxtaposition within said aperture;

a tubular member dimensioned to pass through said aperture with the surface of said tube member in close proximity to said teeth;

said tube member including recess portions interlocking with said teeth when the upper portion of said legs are positioned defining said aperture;

the upper end of said tube including means for holding a load.

2. The combination in accordance with claim 1 wherein said upper portion of said legs cooperate to define a substantially constant cross section tubular portion when the leg portions are in supporting positions.

3. The combination in accordance with claim 2 when said column includes laterally extending portions above and below said opening of said tubular portion defined by said leg portions whereby said column member may not be disengaged from said legs.

4. The combination in accordance with claim 1 wherein said legs include a plurality of equally spaced teeth extending along the length of said aperture and wherein said column includes a number of recesses extending there along.

5. The combination in accordance with claim 4 wherein each of said legs includes a different number of teeth from the recesses in said column whereby the relative height of said column with respect to the base of said legs may be selected.

6. The combination in accordance with claim 1 wherein said leg members are pivotally mounted to rotate to substantially enclose said column for storage.

7. The combination in accordance with claim 2 wherein the leg members each include generally coplanar surfaces when in support position cooperating to form a substantially flat rectangular flanged support surface, thereby providing a stable planar surface against the floor in use.

8. The combination in accordance with claim 1 wherein said tubular column member is of rectangular cross sectional shape and said legs define a substantially rectangular aperture.

* * * * *